United States Patent [19]

Oku

[11] Patent Number: 5,255,177
[45] Date of Patent: Oct. 19, 1993

[54] HIGH-VOLTAGE POWER SOURCE CONTROL DEVICE

[75] Inventor: Juntaro Oku, Numazu, Japan

[73] Assignee: Tokyo Electric Co., Ltd., Tokyo, Japan

[21] Appl. No.: 903,515

[22] Filed: Jun. 24, 1992

[30] Foreign Application Priority Data

Jun. 27, 1991 [JP] Japan ................... 3-156621

[51] Int. Cl.$^5$ ................... H02M 3/28; H02M 7/48
[52] U.S. Cl. ................... 363/95; 363/97
[58] Field of Search ................... 363/95, 96, 97, 98

[56] References Cited

U.S. PATENT DOCUMENTS

| | | | |
|---|---|---|---|
| 4,595,976 | 6/1986 | Parro, II ................... | 363/98 |
| 4,686,340 | 8/1987 | Fukasawa ................... | 363/97 |
| 4,825,028 | 4/1989 | Smith ................... | 363/98 |
| 5,047,910 | 9/1991 | Levran et al. ................... | 363/98 |
| 5,055,993 | 10/1991 | Miyata et al. ................... | 363/98 |

*Primary Examiner*—Jeffrey Sterrett
*Attorney, Agent, or Firm*—Frishauf, Holtz, Goodman & Woodward

[57] ABSTRACT

A high-voltage power source control device comprises a pulse generating section for holding duration data and periodically generating a switching pulse of a duration corresponding to the duration data, a monitor circuit for generating a monitor voltage corresponding to an output voltage of a high voltage power source, an A/D converter for outputting monitor voltage data based on a monitor voltage from the monitor circuit, and a processing section for deriving as adjustment data a difference between the monitor voltage data from the A/D converter and the reference voltage data, adding the adjustment data to the duration data, and setting the result of addition into the pulse generating section as new duration data to change the duty ratio of the switching pulse, thereby maintaining the output voltage of the high voltage power source at or near the reference voltage. The processing section in the control device has a shift register for decreasing the adjustment data at a preset rate.

8 Claims, 7 Drawing Sheets

HIGH-VOLTAGE POWER SOURCE CONTROL DEVICE

BACKGROUND OF THE INVENTION

1. Field of the Invention

This invention relates to a control device used in electrophotographic image forming devices, for controlling a high voltage power source which generates a high voltage required for forming an electrophotographic image, for example, and more particularly to a control device for controlling a high voltage power source which generates the high voltage by switching a primary current in a transformer provided therein.

2. Description of the Related Art

A copy machine and laser printer are known examples of an electrophotographic image forming device. An image forming device typically includes a photosensitive drum serving as an image carrier, for example, and it additionally includes a charging section, an exposing section, a developing section, and a transferring section arranged to surround the photosensitive drum. In the image forming process, the photosensitive drum is rotated in one direction and sequentially subjected to corresponding processes in the charging section, exposing section, developing section, and transferring section. The charging section uniformly charges the surface of the photosensitive drum, the exposing section selectively exposes the drum surface to create an electrostatic latent image, and the developing section charges toners and supplies the charged toners to the drum surface so as to develop the thus created electrostatic latent image. The toners are attached to the electrostatic latent image on the surface of the photosensitive drum to convert the electrostatic latent image into a visible toner image. The transferring section charges paper and supplies the same to a position at which image transfer is effected, thereby to transfer the image formed on the drum surface to the paper. The image forming device further includes a plurality of sets of high voltage power sources and high-voltage power source control devices for stably supplying high voltages of approx. 5 kV which are required in the electrostatic charger, developing sleeve and transfer charger respectively arranged on the charging section, developing section, and transferring section. As shown in FIG. 1, each of the high voltage power sources includes a high voltage generating transformer for generating a high voltage and a switching circuit for periodically switching the primary current of the transformer.

The conventional high-voltage power source control device has the following construction for controlling the high voltage power source. The control device includes a switching controller 10, an A/D converter 12, and a monitor circuit 14 which are connected to one another as shown in FIG. 1. The switching controller 10 includes a counter for counting clocks and generates a switching pulse each time the output of the counter reaches a value indicating a preset switching period suitable for the high voltage power source HV. In the high voltage power source HV, the switching circuit permits a primary current to flow in the high voltage generating transformer for the duration of a switching pulse supplied from the switching controller 10 and the high voltage generating transformer generates a high voltage according to variation in the primary current. An output voltage of the high voltage generating transformer, i.e., an output voltage of the high voltage power source, rises or falls according to variation in the load, and the rising or falling thereof being detected by a monitor circuit 14. An output voltage of the monitor circuit 14 is supplied to the A/D converter 12 as a monitor voltage. The A/D converter 12 repeatedly converts the monitor voltage into a digital signal which it supplies to the switching controller 10 as monitor voltage data. The switching controller 10 holds reference voltage data representing a reference value of the output voltage of the high-voltage power source and adjusts the duty ratio of the switching pulse according to a difference between the reference voltage data and the monitor voltage data. This adjusting operation is repeated each time the monitor voltage is subjected to the A/D converting process so as to hold the output voltage of the high voltage power source near the reference value. In the process of adjusting the duty ratio, the difference between the reference voltage data and the monitor voltage data is added to the duration data of the switching pulse and the result of addition is used to specify the duration for succeeding switching pulses. If the result of addition exceeds one half the switching period, the duration of the switching pulse is set to one half the switching period and thus the maximum value of the duty ratio is limited to 50%.

In order to stabilize an output voltage of the high voltage power source by the high-voltage power source control device, it is necessary to set the relation that the 1-LSB resolution of the A/D converter is lower than the 1-LSB resolution of the counter. When the high voltage power source is used to supply a high voltage of 5 kV to the load of the electrostatic charger, developing sleeve, transferring charger, or the like, a voltage variation of $\pm 50$ V is permitted. If the precision of $\pm \frac{1}{2}$ LSB of the A/D converter is set to fall within the permissible range of the voltage variation, the 1-LSB resolution of the A/D converter becomes 100 V for an output voltage of the high voltage power source. In this case, the reference value ($=5$ kV) is represented by 5 kV/100 V$=50$ (i.e., 32h, where h is a hexadecimal number). In order to represent the reference value, 6 bits are necessary, but normally, a general type 8-bit A/D converter, which is not so expensive as a 6-bit A/D converter is used as the A/D converter. In order to set the maximum duty ratio of the switching pulse to 50% and obtain 5 kV, a switching period of 25 $\mu$s is necessary. The duration of the switching pulse must be changed by 50 ns in order to change the output voltage of the high voltage power source by 100 V by a single adjustment of the duty ratio. If the 1-LSB resolution of the counter corresponds to 50 ns, the switching period ($=25$ $\mu$s) can be expressed by 25 $\mu$s/50 ns$=500$ (i.e., 1F4h, where h is a hexadecimal number). Therefore, the counter must be of 9-bit type in order to represent the above value. If the 1-LSB resolution of the counter is set to be higher than the 1-LSB resolution of the A/D converter, variation in the output voltage of the high voltage power source can be stabilized near the reference voltage by the adjustment of the duty ratio of the switching pulse, as shown in FIG. 2.

However, in this case, the high-voltage power source control device has the following defects arising from the relation that the resolution of the counter is higher than that of the A/D converter. Specifically, when plural units of high-voltage power source control devices are manufactured, variation in the control ability thereof due to variation in the performance of the A/D converters used becomes relatively large, and this undesirable from the viewpoint of device reliability. One measure considered in order to overcome the above drawback was to reduce an error in the conversion of the monitor voltage by setting the 1-LSB resolution of the A/D converter approximately equal to the 1-LSB resolution of the counter, for example. However, use of this measure created a new problem in that the output voltage of the high voltage power source could not easily be set stable in relation to the reference voltage as shown in FIG. 3. The problem could be overcome by increasing the number of bits of the counter, together with the clock frequency, so as to set up the desired relation. However, unlike the A/D converter, the cost of the counter and the peripheral circuit thereof became significantly higher due to the increase in the bit number because it is necessary to attain the high speed operation. Therefore, increasing the bit number of the counter is not an effective solution, since it drives up the manufacturing cost.

Variation in the control ability caused by a difference in the performance of A/D converters used will be explained. FIG. 4 shows the input/output characteristic of three A/D converters. Each of the three A/D converters is designed to convert a monitor voltage to a digital value in units of 0.1 V and has a precision or conversion error of ±0.05 V (=½ LSB). When the monitor voltage of 2.5 V is set for the reference voltage (=5 kV) of the output voltage of the high voltage power source, the first A/D converter converts a monitor voltage of 2.45 V to 2.55 V to monitor voltage data of "80h", for example, as shown by a solid line, the second A/D converter converts a monitor voltage of 2.40 V to 2.50 V to monitor voltage data of "80h", as shown by broken lines, and the third A/D converter converts a monitor voltage of 2.50 V to 2.60 V to monitor voltage data of "80h" (h is a hexadecimal number), as shown by one-dot-dash lines. In other words, the range of the monitor voltages each of which is converted to the same monitor voltage data differs in accordance with the varying process conditions under which individual A/D converters were manufactured. As a result, an output voltage of the high voltage power source is set stable in a range of (5.0 kV±50 V), (5.05 kV±50 V), or (4.95 kV±50 V) in the case of A/D converters with a conversion error of (2.5 V±0.05 V), (2.55 V ±0.05 V), or (2.45 V±0.05 V), respectively, for example. In the case of the high-voltage power source control devices made up of plural units, the central value of the stabilized range, i.e., the target value varies in a range of (the reference value±50 V), as shown in FIG. 5, even when the conversion error of the A/D converters used is uniform.

SUMMARY OF THE INVENTION

An object of this invention is to provide a high-voltage power source control device capable of reducing variation in the control ability of devices formed without adversely affecting the operation by which an output voltage of a high voltage power source is set stable near a reference voltage.

The above object can be attained by a high-voltage power source control device comprising a pulse generating section for periodically generating a switching pulse of a duration corresponding to duration data; a monitor section for generating a monitor voltage corresponding to an output voltage of the high voltage power source; an A/D converter section for converting a monitor voltage from the monitor section to monitor voltage data; and a control section for deriving as adjustment data a difference between the monitor voltage data from the A/D converter section and the reference voltage data, adding the adjustment data to the duration data, and setting the result of addition into the pulse generating section as new duration data to change the duty ratio of the switching pulse, thereby maintaining the output voltage of the high voltage power source at or near the reference voltage; the control section having a dividing section for decreasing the adjustment data at a preset rate.

When, in the above high-voltage power source control device, the adjustment data (the difference between the monitor voltage data and the reference voltage data) is derived, the adjustment data is decreased at a preset rate—for example, by ½. The adjusting amount of the duty ratio of the switching pulse is uniformly reduced by use of the adjustment data. Therefore, the operation of stabilizing an output voltage of the high voltage power source will not be prevented even when the bit number of the A/D converter section is independently increased to reduce variation in the control ability caused by a difference in the A/D converter section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

A high-voltage power source control device according to an embodiment of this invention will now be described with reference to FIGS. 6 to 10.

The high voltage power source control device is incorporated into an electrophotographic image forming device which includes a photosensitive drum serving as an image carrier, for example, and further includes a charging section, an exposing section, a developing section, and a transferring section arranged to surround the photosensitive drum.

Figure 1:
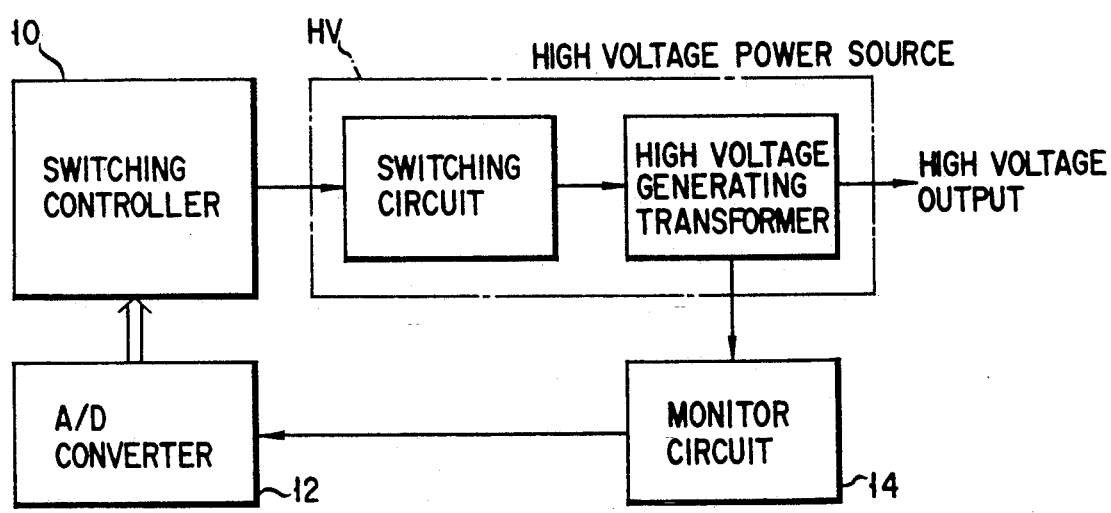
FIG. 1 is a diagram showing a conventional high-voltage power source control device, together with a high voltage power source.
Figure 2:
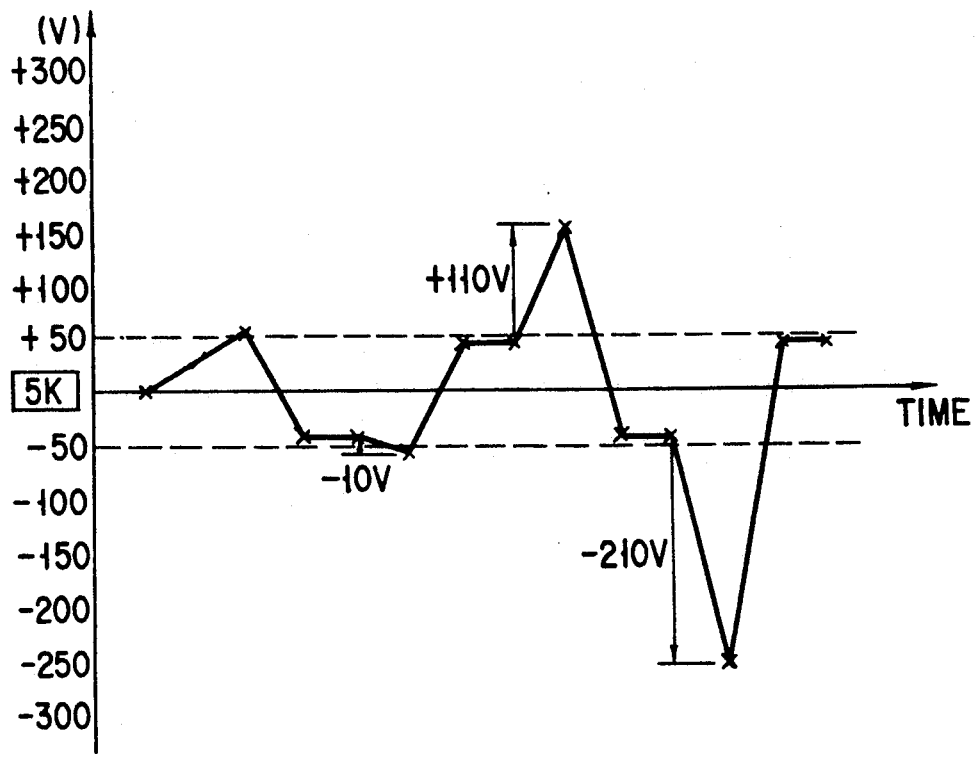
FIG. 2 is a diagram showing the state in which an output voltage of the high voltage power source shown in FIG. 1 is stabilized by the duty ratio adjustment effected under the condition that the 1-LSB resolution of an A/D converter is lower than the 1-LSB resolution of a counter.
Figure 3:
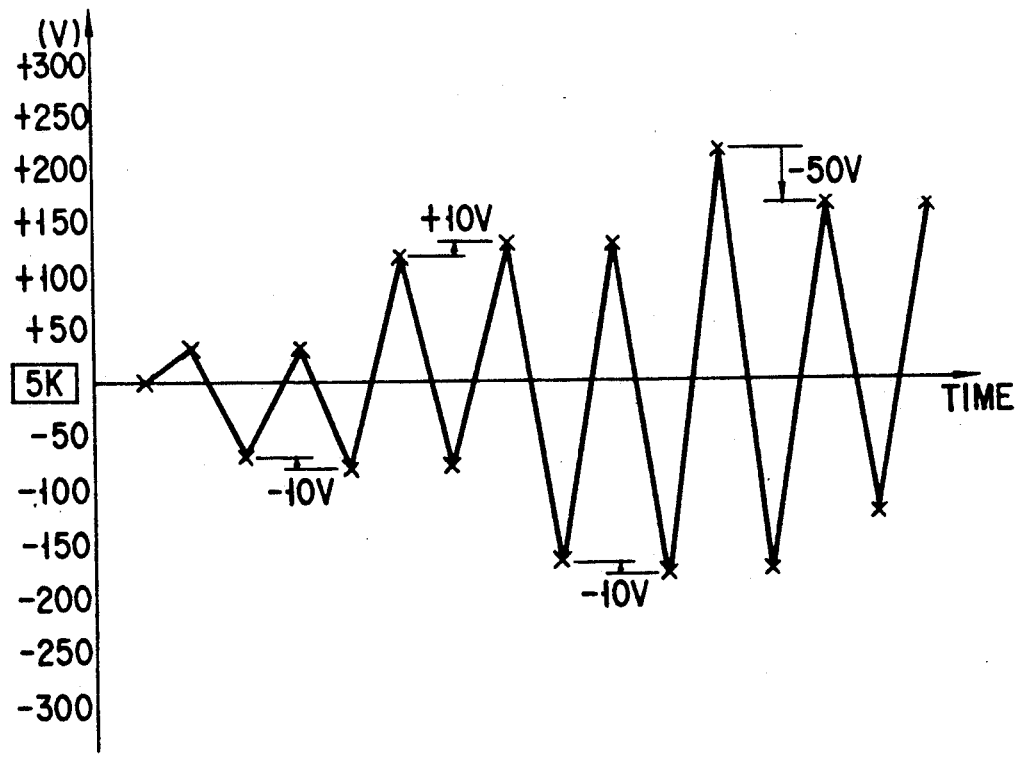
FIG. 3 is a diagram showing the state in which an output voltage of the high voltage power source shown in FIG. 1 is hardly be stabilized by the duty ratio adjustment effected under the condition that the 1-LSB resolution of the A/D converter is equal to the 1-LSB resolution of the counter.
Figure 4:
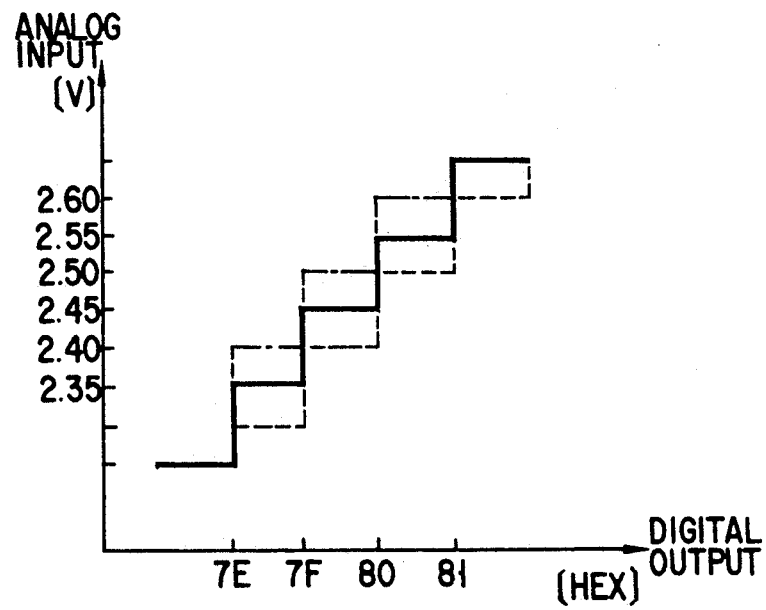
FIG. 4 is a diagram showing the input/output characteristics of three A/D converters formed to be incorporated into the high voltage power source shown in FIG. 1.
Figure 5:
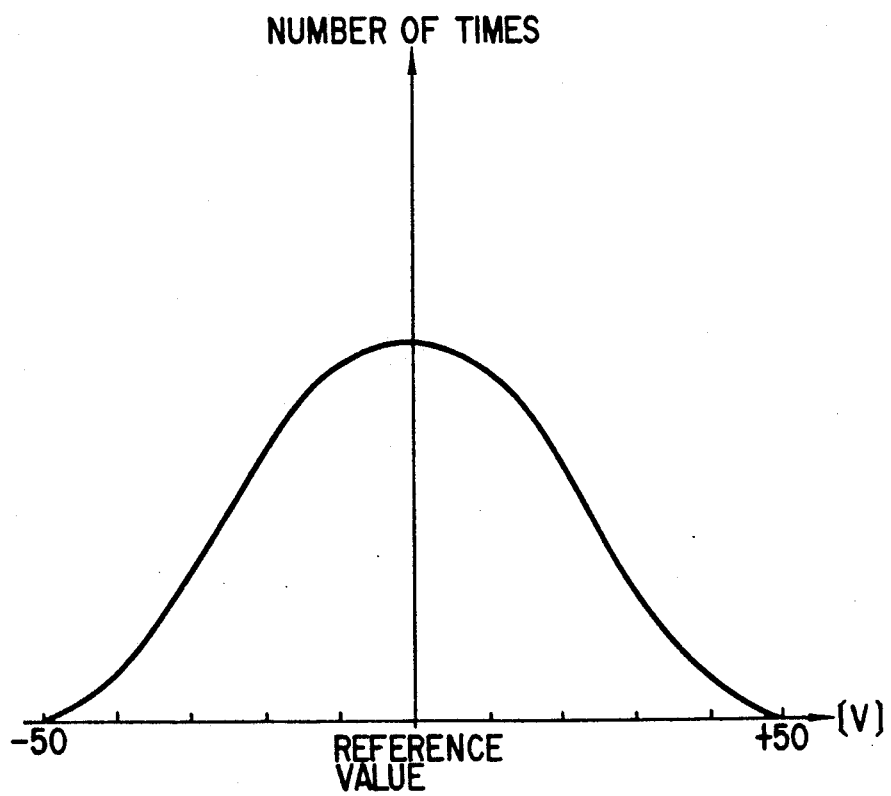
FIG. 5 is a diagram showing variation in the control ability of units of the high-voltage power source control device shown in FIG. 1.
Figure 6:
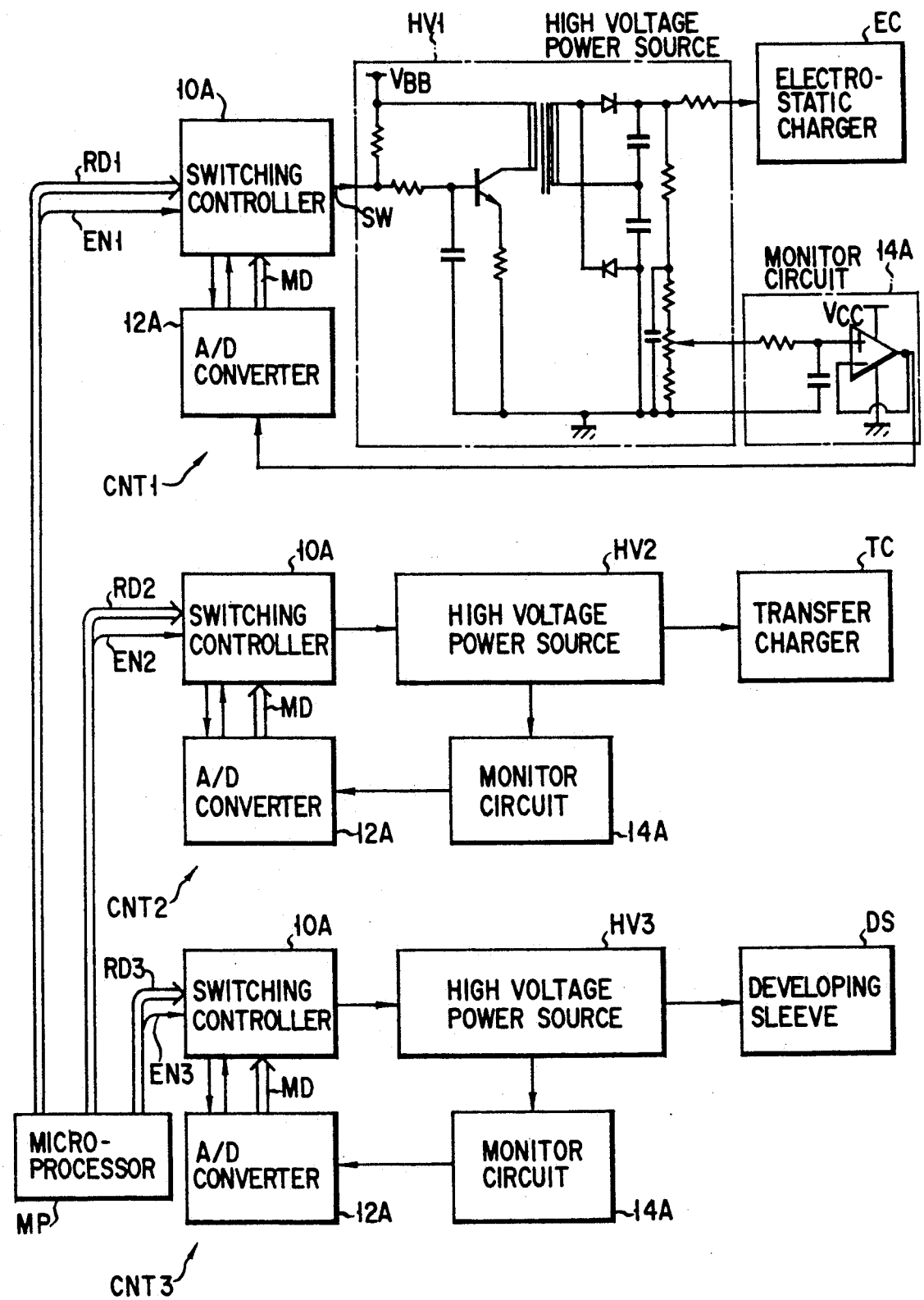
FIG. 6 is a block diagram showing part of an electrophotographic image forming device into which a high-voltage power source control device according to one embodiment of this invention is incorporated.

FIG. 6 shows part of the electrophotographic image forming device. The charging section includes an electrostatic charger EC for charging the surface of the photosensitive drum. The transferring section includes a transferring charger TC for charging paper, and the developing section includes a developing sleeve DS for charging toners. The image forming device includes a high voltage power source HV1 for supplying a high voltage to the electrostatic charger EC, a high voltage power source HV2 for supplying a high voltage to the developing sleeve DS, and a high voltage power source HV3 for supplying a high voltage to the transferring charger TC. The image forming device also includes high-voltage power source control devices CNT1 to CNT3 for respectively controlling the high voltage power sources HV1 to HV3. The high voltage power source HV1 is constructed in the same manner as the high voltage power sources HV2 and HV3, and the high-voltage power source control device CNT1 is constructed in the same manner as the high-voltage power source control devices CNT2 and CNT3. Each of the high-voltage power sources HV1 to HV3 is constructed by a high voltage generating transformer for generating a high voltage and a switching circuit for switching the primary current of the transformer. The high-voltage power source control devices CNT1 to CNT3 are connected to a microprocessor MP for controlling the overall operation of the image forming device. In performing its control function, the microprocessor MP generates reference voltage data RD1 to RD3 and also enable signals EN1 to EN3. The reference voltage data RD1 to RD3 are initially supplied to the high-voltage power source control devices CNT1 to CNT3 as the reference values of the output voltages of the high voltage power sources HV1 to HV3, respectively. The enable signals EN1 to EN3 are supplied to the high-voltage power source control devices CNT1 to CNT3 during the periods in which the electrostatic charger EC, the transferring charger TC, and the developing sleeve DS are to be driven, respectively.

The construction of the high-voltage power source control device CNT1 will be explained in more detail with reference to FIG. 6. As the high-voltage power source control devices CNT2 and CNT3 are constructed in the same manner as the high-voltage power source control device CNT1, the following explanation is also applicable thereto.

The high-voltage power source control device CNT1 includes a switching controller 10A, an A/D converter 12A, and a monitor circuit 14A which are connected as shown in FIG. 6. The switching controller 10A periodically supplies a switching pulse SW to the switching circuit of the high voltage power source HV1. The switching circuit permits a primary current to flow in the high voltage generating transformer during the period corresponding to the duration of the switching pulse SW. Thus, the high voltage generating transformer generates a high voltage according to variation in the primary current. The monitor circuit 14A detects an output voltage of the high voltage generating transformer as an output voltage of the high voltage power source HV1 and generates a monitor voltage corresponding to the output voltage of the high voltage power source HV1. The A/D converter 12A is designed to convert the monitor voltage supplied from the monitor circuit 14A into monitor voltage data MD and to supply the monitor voltage data MD to the switching controller 10A. The switching controller 10A adjusts the duty ratio of the switching pulse SW according to the monitor voltage data MD in order to maintain the output voltage of the high voltage power source HV1, varying according to the load at or near the reference value.

Figure 7:
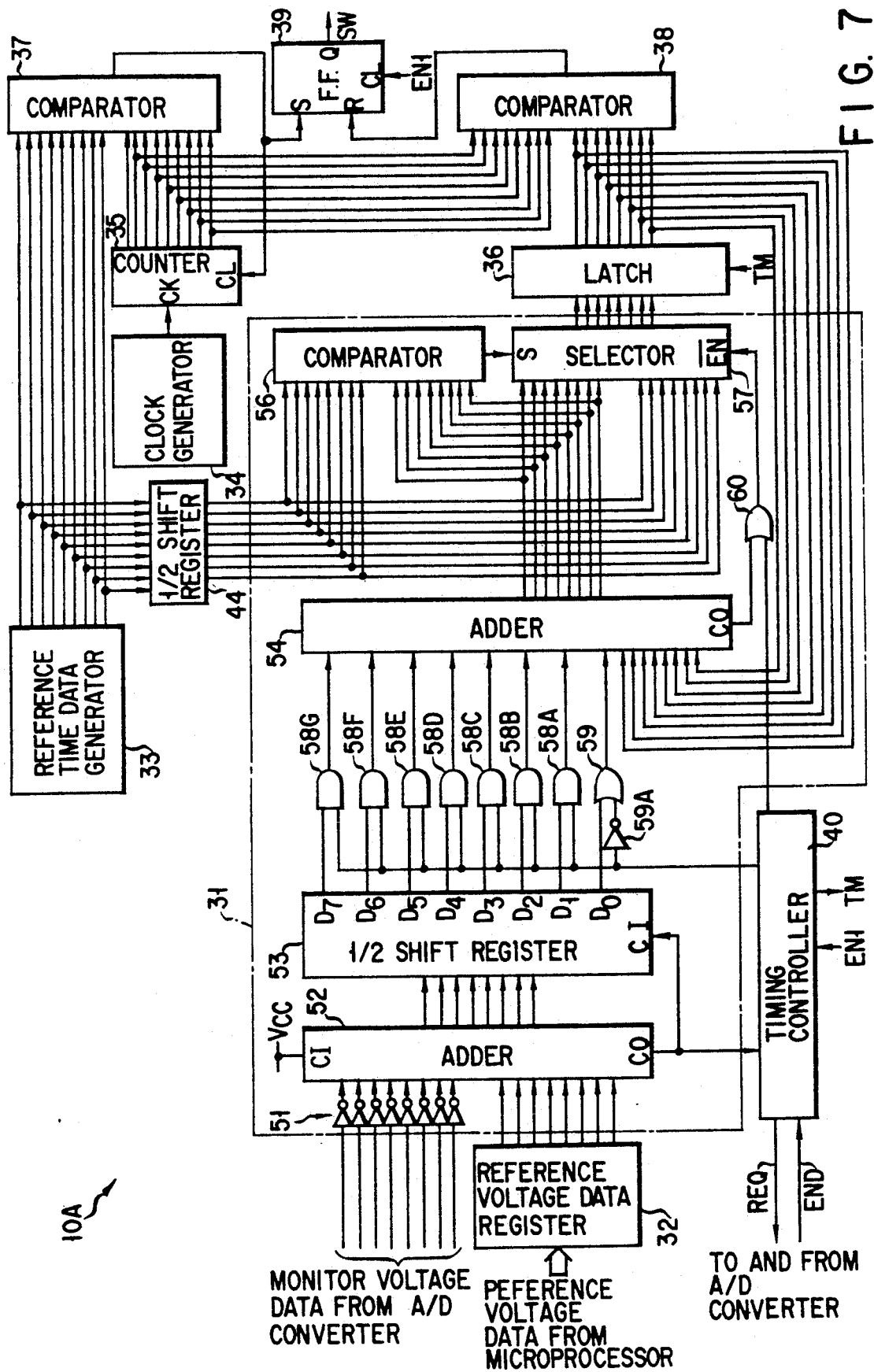
FIG. 7 is a circuit diagram showing the construction of a switching controller shown in FIG. 6.

FIG. 7 shows the construction of the switching controller 10A in more detail. The switching controller 10A includes a data processing section 31, reference voltage data register 32, reference time data generator 33, clock generator 34, counter 35, latch circuit 36, comparators 37 and 38, RS flip-flop 39, shift register 44, and timing controller 40. The timing controller 40 is made active when the enable signal EN1 is supplied from the microprocessor MP, and controls timings for operating the A/D converter 12A, data processing section 31, and latch circuit 36.

More specifically, the timing controller 40 periodically supplies a request signal REQ to the A/D converter 12A. The A/D converter 12A performs A/D conversion in response to the request signal REQ, and then supplies an end signal END to the timing controller 40. The reference voltage register 32 holds reference voltage data RD1 supplied from the microprocessor MP and prestored therein. The data processing section 31 determines the duration of a switching pulse SW on the basis of a difference between the monitor voltage data MD from the A/D converter 12A and the reference voltage data RD1 from the reference voltage data register 32, and produces duration data representing the determined pulse duration. After producing the duration data, the timing controller 40 supplies a latch enable signal TM to the latch circuit 36. The latch circuit 36 latches the duration data in response to the latch enable signal TM and supplies it to the comparator 38.

When the monitor voltage data MD from the A/D converter 12A exceeds the reference voltage data RD1 from the reference voltage register 32, a detection signal is supplied from the data processing section 31 to the timing controller 40. The timing controller 40 supplies to the data processing section 31 a gate control signal which is set at "L" level until a detection signal is initially supplied after the timing controller 40 is made active, so that the adjustment of the duty ratio is inhibited from reflecting monitor voltage data MD, and the gate control signal then being set at "H" level after supply of the initial detection signal, so that the reflecting of monitor voltage data MD is permitted. Further, the timing controller 40 supplies an output enable signal of "L" level to the data processing section 31 when it is active.

The clock generator 34 generates a clock pulse at a predetermined frequency, the counter 35 counts the number of clock pulses supplied from the clock generator 34 so as to generate count data representing the count. The reference time data generator 33 generates reference time data RT representing the number of clock pulses corresponding to a preset switching period suitable for the high voltage source HV1. The comparator 37 compares the count data supplied from the counter 35 and the reference time data RT supplied from the data generator 33, and generates a coincidence signal when it is detected that the count data coincides with the reference time data RT. The coincidence signal is supplied to the counter 35 to clear the count to zero, and to the set terminal of the RS flip-flop 39. The comparator 38 compares the duration data supplied from the latch circuit 36 and the count data (lower eight bits) supplied from the counter 35, and generates a coincidence signal when it is detected that the count data coincides with the duration data. This coincidence signal is supplied to the reset terminal of the RS flip-flop 39. The switching pulse SW is obtained from the Q-output terminal of the RS flip-flop 39 after the RS flip-flop 39 is initialized upon rise of the enable signal EN1 supplied thereto. The switching pulse SW rises to "H" level when the RS flip-flop 39 is set in response to the coincidence signal from the comparator 37, and falls to "L" level when the RS flip-flop 39 is reset in response to the coincidence signal from comparator 38. Further, the shift register 44 shifts the reference time data RT from the data generator 33, so that the time data RT is divided to half. The time data of RT/2 is supplied to the data processing section 31 as a maximum value of the duration data.

The configuration of the data processing section 31 will be described in more detail. The data processing section 31 includes shift register 53, comparator 56, selector 57, inverter 59, NOT gates 51, adders 52 and 54, AND gates 58A to 58G, and OR gates 59 and 60. The NOT gates 51 convert the monitor voltage data MD from the A/D converter 12A to a 1s complement form and supply it to the adder 52. The adder 52 increments the data from the NOT gates 51 by a carry "1" from VCC to form a 2s complement thereof, and adds thus complemented data to reference voltage data RD1 to produce difference data representing a difference between the voltage data items RD1 and MD. The difference data is supplied to the shift register 53. The shift register 53 shifts the difference data so that it is divided by 2. An output terminal D0 (LSB) of the shift resister 53 is connected to the first input terminal of the OR gate 59, and the other output terminals D1 to D7 of the shift register 53 are connected to the first input terminals of the AND gates 58A to 58G. The second input terminal of the OR gate 59 is connected to the timing controller 40 via the inverter 59A to receive the gate control signal. The second input terminals of the AND gates 58A to 58G are connected directly to the timing controller 40 to receive the gate control signal. The adder 52 is connected to the shift register 53 and the timing controller 40 to supply a carry obtained when the result of addition is negative. The timing controller 40 receives the carry as a detection signal representing that the monitor voltage data is larger than the reference voltage data. The output terminals of gates 59 and 58A to 58G are connected to the adder 54 to supply adjustment data. On the other hand, the latch circuit 36 is connected to the adder 54 to supply the data latched therein as current duration data. The adder 54 adds the adjustment data to this duration data and produces output data representing the result of addition. An output data of the adder 54 is supplied to the first input port of the comparator 56 and the first input port of the selector 57. The output data (RT/2) of the shift register 44 is the second input port of the comparator 56 and the second input port of the selector 57. The comparator 56 compares output data of the adder 54 with output data of the shift resister 44, and supplies a switch signal to the selector 57 when it is detected that the output data the adder 54 is larger than that of the shift register 44. The selector 57 supplies the output data of the adder 54 to the latch circuit 36 as new duration data when no switch signal is supplied from the comparator 56, and the output data of the shift register 44 to the latch circuit 36 as new duration data when a switch signal is supplied from the comparator 56. Further, the adder 54 outputs a carry when the result of addition is negative. The OR gate 60 supplies the output enable signal input from the timing controller 40 to the selector 57, except when the carry is output from the adder 54.

In the control device CNT1, the 1-LSB resolution of the A/D converter 12A and the counter 35 are respectively set at 50 V and 100 V for the output voltage of the high voltage power source HV1 when the reference value of the output voltage of the power source HV1 is 5 kV and the switching period is 25 μs. Accordingly, A/D converter 12A, reference voltage data register 32, adders 52 and 54, shift register 53, comparators 38 and 56, latch circuit 36, and selector 57 are of 8-bit type, and the counter 35 and comparator 37, reference time data generator 33, and shift register 44 are of 9-bit type. The clock generator 34 generates a clock pulse of 20 MHz (i.e., the clock period is 50 ns), the reference time data generator 33 generates reference time data RT of "1F4h"·, and the reference voltage data register 32 stores reference voltage data RD1 of "64h" (where h is a hexadecimal number). The switching period depends on the specification of the high voltage power source HV1, while the clock period depends on the switching period and relation between the duty ratio of the switching pulse SW and the output voltage of the high voltage power source HV1. In this embodiment, "50 ns" of the clock period is obtained by 25 μs×0.2%/100 V, "1F4h" of the reference time data RT is obtained by 25 μs/50 ns, and "64h" of the reference voltage data RD1 is obtained by 5 kV/50 V.

Figure 8:
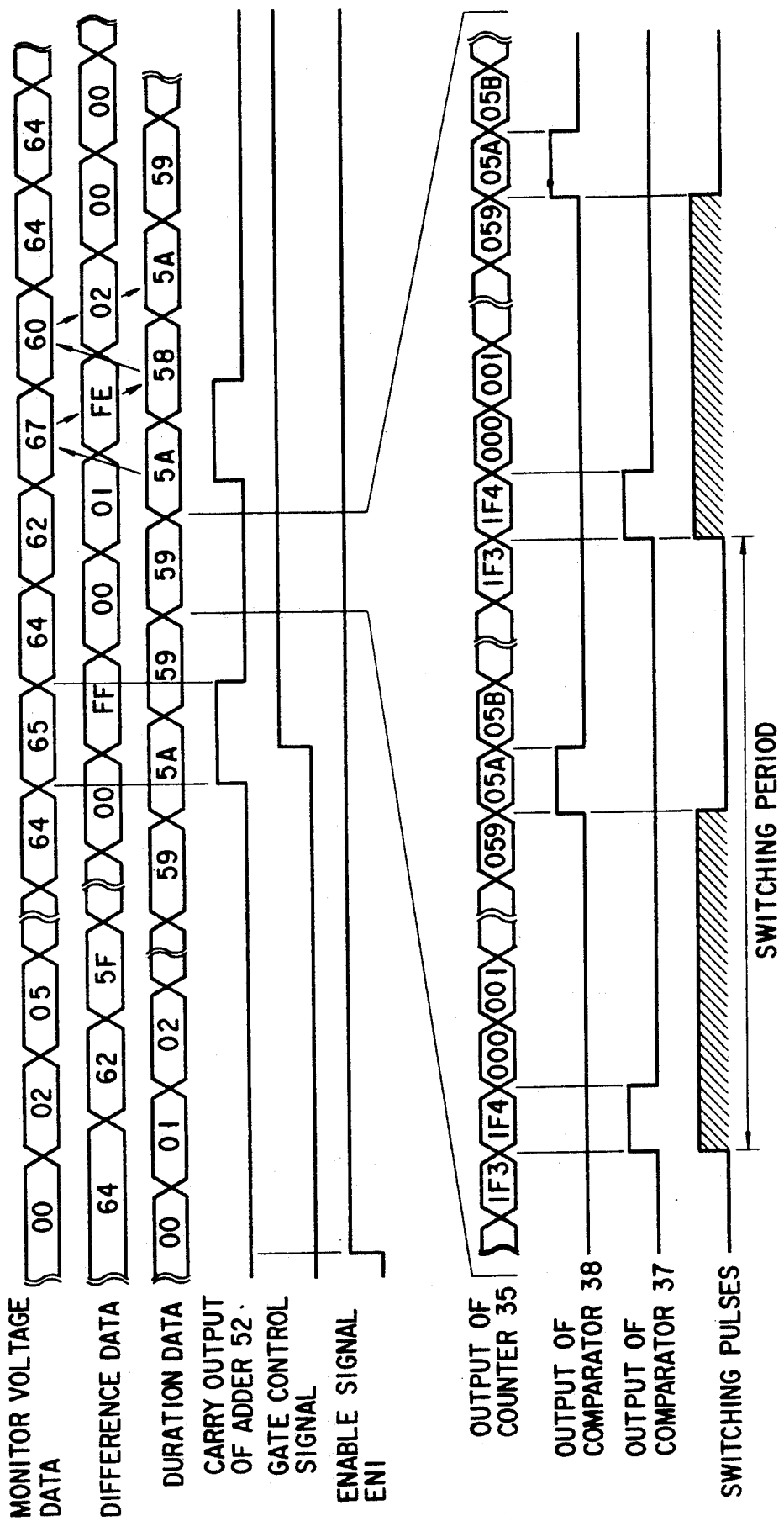
FIG. 8 is a diagram showing the operation of the switching controller shown in FIG. 6.

FIG. 8 shows the operation of the high-voltage power source control device CNT1.

In an initializing process immediately after application of power, the microprocessor MP supplies reference voltage data RD1 to the control device CNT1. Thereafter, the microprocessor MP supplies an enable signal EN1 to the control device CNT1. In the control device CNT1, the reference time data generator 33 supplies reference time data RT of "1F4h" to the comparator 37. The counter 35 receives a clock pulse generated from the clock generator 34 for each period of 50 ns and counts the number thereof to supply the count to the comparator 37 as count data. The comparator 37 sets the RS flip-flop 39 and clear the counter 35 when it is detected that the count data coincides with "1F4h". On the other hand, the comparator 38 resets the RS flip-flop 39 when it is detected that the count data from the counter 35 coincides with the duration data from the latch circuit 36. Therefore, the switching pulse SW rises each time the count data reaches to a fixed value "1F4h" defined by the reference time data RT, and falls each time the count data reaches a variable value defined by the duration data. The duration data is set at "00h" immediately after the enable signal EN1 is supplied to the control device CNT1. At this time, the output voltage of the high voltage power source HV1 is zero. Upon application of the enable signal EN1, the timing controller 40 sets the gate control signal at "L" level, and permits the operation of the A/D converter 12A to begin. An output voltage of the high voltage power source HV1 is detected by the monitor circuit 14A, and supplied to the A/D converter 12A as a monitor voltage. The A/D converter 12A converts the monitor voltage into monitor voltage data MD. The monitor voltage data MD is supplied to the adder 52 via NOT gates 51. At the adder 52, the reference voltage data RD1 is subtracted by the monitor voltage data MD, and a result thereof is supplied to the shift register 53 as difference data. The shift register 53 shifts the difference data so that it is reduced to half its initial value. This reference data is not supplied to the adder 54 as adjustment data when the gate control signal at "L" level. In other words, the output data from the shift register 53 is blocked by a selector constituted by OR gate 59, inverter 59A, and AND gates 58A to 58G. In this case, the outputs of the AND gates 58A to 58G are set at "0", and the output of the OR gate 59 is set at "1", thereby supplying adjustment data "01h" to the adder 54. The adder 54 adds the adjustment data to the duration data from the latch circuit 36, and supplies output data representing the result of addition to the selector 57 and the comparator 56. The selector 57 selects the output data of the adder 54 when the comparator 56 detects that the output data of the adder 54 does not exceed one half the reference time data RT, and selects the output data of the shift register 44 when the comparator 56 detects that the output data of the adder 54 exceeds one half the reference time data RT. The latch circuit 36 latches the selected data as new duration data which specifies the duration of successive switching pulses SW.

The timing controller 40 controls the latch circuit 36 to latch new duration data in each operation cycle of the A/D converter 12A. Since the duration data is fed back from the latch circuit 36 to the adder 54, the duration of the switching pulse SW changes in increments of "01h" as shown in FIG. 8. The output voltage of the high voltage power source HV1 rises in accordance with the change in the duration of the switching pulse SW. The operation of the A/D converter 12A is repeated during the rising of the output voltage of the high voltage power source HV1. If the monitor voltage data MD from the A/D converter 12A reaches "65h", i.e., higher than "64h" of the reference voltage data RD1, a carry is supplied from the adder 52 to the timing controller 40. Upon receipt of the carry, the timing controller 40 sets the gate control signal at "H" level, thereby allowing the output data of the shift register to be supplied to the adder 54 as adjustment data. The adder 52 supplies difference data "FFh" to the shift register 53 when the monitor voltage data MD is "65h". If the duration data is presently "5Ah", it is updated to "59h" to adjust the duty ratio of the switching pulse SW. The output voltage of the high voltage power source HV1 is decreased by the adjustment, and the monitor voltage data MD changes to "64h", accordingly. At this time, the adder 52 supplies difference data "00h" to the shift register 53, thereby maintaining the duration data at "59h". If the monitor voltage data MD changes to "62h" due to decreasing of the output voltage of the high voltage power source HV1, the adder 52h supplies difference data "01h" to the shift register 53. At this time, the duration data changes to "5Ah". Thereafter, the monitor voltage data MD, difference data, and duration data are changed as shown by the arrows in FIG. 8.

Figure 9:
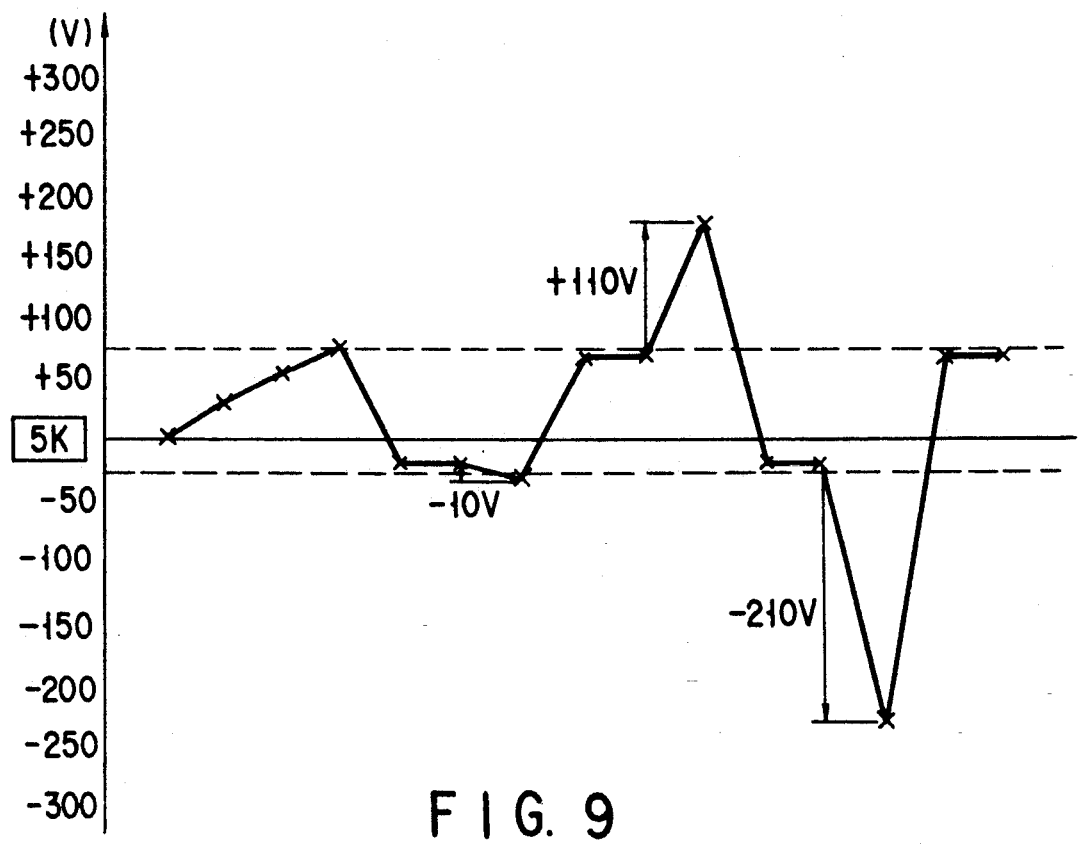
FIG. 9 is a diagram showing the state in which the output voltage of the high voltage power source is stabilized by the duty ratio adjustment.
Figure 10:
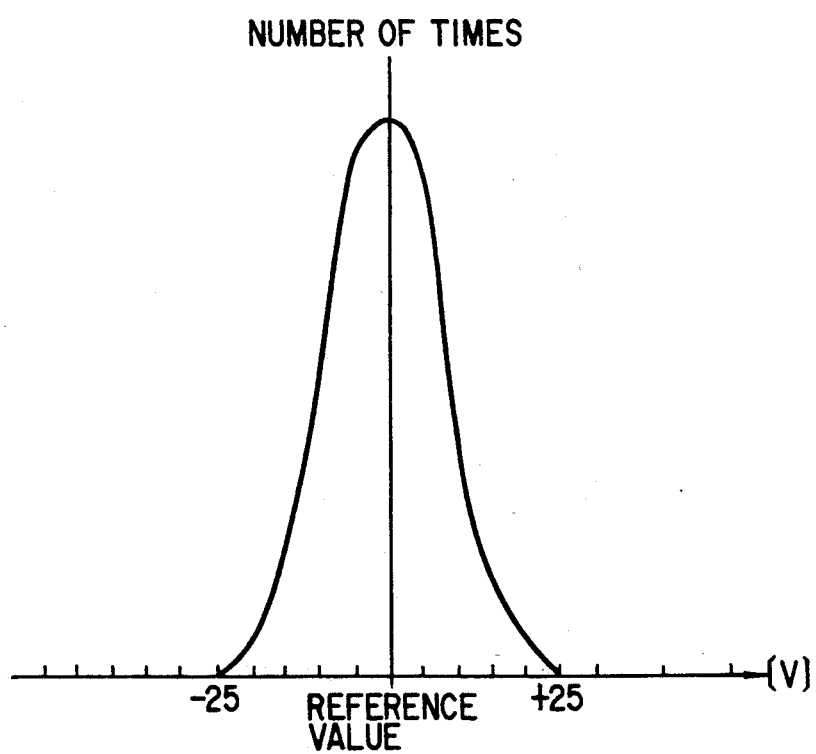
FIG. 10 is a diagram showing variation in the control ability of the high-voltage power source control device made up of plural units.

Although, in the embodiment described above, the 1-LSB resolution of the A/D converter 12A and the counter 35 are respectively set at 50 V and 100 V for the output voltage of the high voltage power source HV1, it is possible to stabilize the output voltage of the high voltage power source HV1 in a range between 5 kV-25 V and 5 kV+75 V, as is shown in FIG. 9. If the central value of the stabilized range is regarded as the target value, the output voltage of the high voltage power source HV1 varies in a range of (the target value ±50 V). On the other hand, when plural units of high-voltage power source control devices are manufactured, it is possible to reduce the variation of the target value in a range of (5 kv±25 V), as shown in FIG. 10, since the 1-LSB resolution of the A/D converter 12A is updated from 100 V to 50 V.

Since the shift register 53 reduces each difference data from the adder 52 to half its initial value, the duty ratio of the switching pulse SW does not undergo extreme changes. Accordingly, the precision of the A/D converter 12A can be set close to that of the counter 35 without affecting the operation for stabilizing the output voltage of the high voltage power source HV1 near the reference voltage. Therefore, it possible to significantly reduce variations in the control ability of plural units of high-voltage power source control devices having A/D converters manufactured under different process conditions.

In the aforementioned embodiment, the shift register 53 is designed to shift the difference data from the adder 52 by one bit so that the difference data is reduced to half its initial value. However, the shift register 53 can be formed to shift the difference data from the adder 52 by two bits, so that the difference data is reduced to quarter its initial value, if the reference voltage data is determined to have an appropriate value at which the 1-LSB resolution of the A/D converter 12A is set at 25 V. In this case, the output voltage of the high voltage power source HV1 is stabilized in a range between 5 kV-12.5 V and 5 kV+87.5 V. In other words, the output voltage of the high voltage power source HV1 varies in a reduced range (i.e., the target value ±12.5 V).

Further, the difference data from the adder 52 can be reduced to half its initial value without use of the shift register 53. In this case, it is necessary to respectively connect second to eighth output terminals of the adder 52 to the first input terminals of the OR gate 59 and AND gates 58A to 58F, and provide a logic circuit which respectively supplies "0" to the first input terminal of the AND gate 58G when the result of addition is a positive number and "1" thereto when the result of addition is a negative number, for example.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A high-voltage power source control device comprising:
   pulse generating means for holding duration data and periodically generating a switching pulse of a duration corresponding to the duration data;
   monitor means for generating a monitor voltage corresponding to an output voltage of a high voltage power source;
   A/D converter means for outputting monitor voltage data based on the monitor voltage from said monitor means; and
   control means for deriving a difference between the monitor voltage data from said A/D converter means and a reference voltage data as adjustment data, adding the adjustment data to the duration data, and setting the result of addition into said pulse generating means as new duration data to change the duty ratio of the switching pulse, thereby maintaining the output voltage of the high voltage power source at or near a reference voltage corresponding to the reference voltage data, said control means having dividing means for decreasing the adjustment data at a preset rate.

2. A device according to claim 1, wherein said control means includes subtracting means for subtracting the monitor voltage data from the reference voltage data, and adding means for adding the adjustment data to the duration data, and said dividing means includes a shift register for dividing difference data obtained from the subtracting means by a shift operation and supplying the result of division to said adding means as the adjustment data.

3. A device according to claim 2, wherein said pulse generating means includes latching means for latching the duration data set by said control means.

4. A device according to claim 3, wherein said adding means includes an adder for adding the adjustment data to the duration data supplied from said latching means.

5. A device according to claim 4, wherein said control means includes gating means for inhibiting an output data of said shift register from being supplied to said adding means as the adjustment data before the monitor voltage data initially exceeds the reference voltage data.

6. A device according to claim 5, wherein said gating means includes a gate circuit for supplying predetermined data to said adder as the adjustment data instead of the output data of said shift register.

7. A device according to claim 1, wherein said pulse generating means includes flip-flop means, clock generating means for generating a clock pulse, counter means for counting the number of clock pulses supplied from said clock generating means to generate count data representing the count, first detecting means for detecting that the count data coincides with a preset data to set said flip-flop means and clear said counter means, and second detecting means for detecting that the count data coincides with the duration data to reset said flip-flop means.

8. A device according to claim 7, wherein a 1-LSB resolution of said A/D converter means is set close to that of said counter means.

* * * * *